United States Patent Office 3,366,707
Patented Jan. 30, 1968

3,366,707
MASTIC COMPOSITIONS
André Delalande, Boulogne, Charles Gangloff, Paris, Jacques Labbé, Mont-Saint-Aignan, Robert Michelet, Marly-le-Roi, and André Rauch, Saint-Aignan, France, assignors to Esso Standard Societe Anonyme Francaise, Courbevoie, Seine, France, a body corporate
No Drawing. Filed Nov. 16, 1964, Ser. No. 411,582
Claims priority, application France, Nov. 15, 1963, 953,939, 953,940
7 Claims. (Cl. 260—852)

ABSTRACT OF THE DISCLOSURE

Mastic composition comprising a blend of a non-vulcanized elastomer, a petroleum resin obtained by polymerization in the presence of a Friedel-Crafts catalyst of mono-olefins and diolefins obtained from steam cracked petroleum distillates, and a thermosetting aldehyde resin.

---

This invention relates to improvements in mastic compositions. In particular the compositions of the invention have adhesive and sealing properties.

Elastomer based mastics find a wide use as sealing and as sound proofing agents, for example in the building and automobile industries where they find employment for sound-proofing bodywork for sealing certain walls, for roofing and other applications.

Among the disadvantages of known mastic compositions are poor resistance to weathering, gradual shrinkage leading to cracking of the mastic and tendency to flow.

The objects of the present invention are to overcome or minimise the disadvantages, including those above referred to, of presently known mastic compositions. Accordingly the mastics of the present invention have little or no flow, they have limited settling properties with reduction of shrinkage during hardening and they retain viscoelastic properties despite a limited degree of hardening. They also have good adhesive properties with natural or synthetic elastomers and other materials such as cement, concrete, asbestos-cement, wood, metals and glass.

The mastics of the present invention comprise at least one non-vulcanized elastomer, at least one thermosetting resin and at least one water repellent resin having adhesive properties.

The elastomer may be a natural or synthetic rubbery elastomer or a high molecular weight polymer or copolymer having some degree of elasticity. It is preferred to select elastomers that are resistant to ageing and to attack by atmospheric agents. Suitable elastomers within this claim include co-polymers of olefins and diolefins such as butyl rubber (a copolymer of isobutylene and isoprene), halogenated butyl rubber, and chloroprene rubbers. Other suitable elastomers of this character are elastomeric copolymers obtained by the co-polymerisation of α-mono-olefins, preferably $C_2$ to $C_8$ mono-olefins, such as ethylene-propylene rubber, elastomeric copolymers of one or more mono-olefins and endocyclic hydrocarbons containing a bridge formed by one or more methylene groups such as norbornylene, dicyclopentadiene and 5-methylene norbornylene olefin polymers preferably having a molecular weight above 20,000 such as polyisobutylenes and reticulated polyethylenes.

Suitable thermo-setting resins are phenol formaldehyde resins such as combination products of phenols, polyphenols, alkyl phenols substituted or not and their halogenated derivatives with formaldehyde. Other suitable thermo-setting resins are aminoplasts obtained by copolymerisation of an amine, or mixtures of amines, preferably polyamines such as hexamethylene tetramine, and tetra-ethylene pentamine or diamines such as hexamethylene diamine and paraphenylene or amides, or related compounds such as urea, cyanuramide and thiourea, with either formaldehyde, or a phenolic compound as above-mentioned or a mixture of the said resins.

Suitable water repellent thermo-plastic resins having adhesive properties include polydienic resin such as petroleum resins obtained by polymerisation in the presence of a Friedel-Crafts catalyst of mono-olefins and diolefins such as those obtained in steam cracked petroleum distillates.

It is a particular advantage for the thermosetting resin and water-repellent resin to be intimately mixed. This intimate mixing is preferably brought by mechanical mixing before addition to the elastomer or by incorporation of the water-repellent resin in the form of a solution in a solvent or an emulsion in the aqueous phase, or preferably, by interpolymerisation of the water-repellent resin and the thermo-setting resin.

This interpolymerisation can be effected by carrying out the copolymerisation of the constituents of the thermo-setting resin in a medium containing the water-repellent resin in suspension in the presence of a catalyst such as an organic peroxide, soda, ammonia or a mixture of soda and ammonia and, preferably of a dispersing agent.

The mastic according to the invention may also contain varying proportions of fillers, pigments, plasticizers and additional adhesive agents. Among these fillers and additives, there may be mentioned the following, mineral fillers such as chalk, kaolin, asbestos, mineral silicates, talc, and baryta, fatty acids such as stearic and oleic acids, plasticisers such as white oil, polybutene, polydiolefins and polyalcohols, e.g., ethylene glycol and glycerol.

The proportions of the three main constituents of the mastic according to the invention are, preferably, from 5 to 500 parts of thermosetting resin and from 5 to 500 parts of adhesive water-repellent resin per 100 parts by weight of elastomer.

The mastic of the invention may also contain from 0 to 2000 parts of fillers and other additives per 100 parts by weight of elastomer.

The mastic of the invention can be prepared by mixing the different components by mechanical means, such as by mixing in industrial mixers.

Although the sequence of addition of the different components exerts little influence on the final result, preferably the elastomer is first placed in the mixer or blender and then in turn the fillers and/or other additives are added, and finally there is added the thermosetting resin and the adhesive water-repellent resin or the blend of these two constituents that has previously been prepared.

The mixture can be made at the ambient temperature but it is often more convenient to work at a higher temperature, ranging for preference from 50 to 100° C.

The mastic thus obtained is easily worked by extrusion and can be rolled on cylinders.

The invention is further illustrated by:

EXAMPLE 1

Different mastics were prepared having the following formulae which are given in parts by weight.

| | Mastic | | | |
|---|---|---|---|---|
| | 1 | 2 | 3 | 4 |
| Butyl rubber marketed as "Esso Butyl 268" | 100 | 100 | 100 | 100 |
| White oil of density 0.852 and viscosity at 37.8° C. 15.7 centistokes | 60 | 60 | 60 | 60 |
| Polyisobutylene of molecular weight 880 marketed as "Napvis 05" | 50 | 50 | 50 | 50 |
| $CaCO_3$ | 550 | 550 | 550 | 550 |
| Powdered asbestos | 150 | 150 | 150 | 150 |
| ZnO | 10 | 10 | 10 | 10 |
| Powdered petroleum resin [1] | | | 40 | |
| Powdered urea-formol resin | | | 40 | 40 |
| Petroleum/urea formol resin interpolymer [2] | 80 | | | |

[1] The petroleum resin, which had been obtained by polymerisation at 40° C., in the presence of 1% aluminum chloride, of fractions derived from the steam cracking of a petroleum distillate, had the following characteristics:
  Molecular weight _____ 1,400
  Ring and Ball softening point, ° C. _____ 96
  Gardner colour (in 50% solution in toluene) _____ 10+

[2] The interpolymer was obtained as follows: The aforementioned petroleum resin, reduced to powder (24 parts by weight), was mixed for 1 hour and 15 minutes at a temperature of 20° C., with formaldehyde (24 parts by weight) in a 30% solution in water, urea (24 parts by weight), and a dispersant (2 parts by weight) consisting of an oxyethylenated amine of the formula:

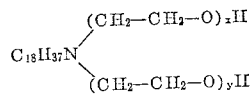

in which $x+y=50$ in the presence of a catalyst consisting of 3 parts by weight $NH_4OH$.

After evaporation under vacuum in a drying closet at ambient temperature for 3 hours an interpolymer was obtained containing 50% petroleum resin and 50% formol urea in the form of pale yellow granules.

These mastics were made in a Werner type mixer at 60° C., the addition being made in the following order:

"Butyl rubber," previously masticated on internal mixer. The different fillers.

then, at the end of the operation, either the interpolymer or the mixture urea/formol resin and petroleum resin previously prepared in a mixer, or the urea/formol resin or the petroleum resin at the same time as the asbestos.

The whole of the operation took 40 minutes for 2 kg. mastic. The following table shows the result of tests performed on these different mastics.

| | Mastic No. | | | |
|---|---|---|---|---|
| | 1 | 2 | 3 | 4 |
| CREEP | | | | |
| (1) In a smooth metal sheet groove filled with mastic and suspended vertically for 3 days in a drying closet at— | | | | |
| 50° C | No | No | Yes | No |
| 70° C | No | Yes | Yes | Yes |
| (According to the Federal specification TTCS 78 E7 abd F 3b) | | | | |
| (2) Layer of mastic 3 mm. thick between 2 asbestos cement plates suspended vertically for 10 days in drying closet at 80° C | No | Yes | Yes | Yes |
| SETTING | | | | |
| At 20° C. in aqueous medium, decrease of penetration of cone (Richardson) (ASTM 217-52 T) in 1/10 mm. after— | | | | |
| 4 days | 4 | 3 | 0 | 0 |
| 10 days | 8 | 6 | 0 | 0 |
| 14 days | 10 | 7 | 0 | 0 |
| 17 days | 11 | 7 | 0 | 0 |
| 20 days | 12 | 7 | 0 | 0 |
| 30 days | 12 | 7 | 0 | 0 |
| RESISTANCE TO TEARING | | | | |
| A sheet of mastic 5c. x 5 cm. and 2.5 mm. thick was placed astride the junction of 2 asbestos cement sheets and covered with an asbestos cement sheet 5 x 10 cm. A pull is exerted on one of the lower sheets, the other being fixed, until the mastic tore or became unstuck. It was found that it tore. Pull causing tearing of mastic after it had remained 2 days in ambient medium in kg | 19 | 12 | 11 | 15 |
| Development of tearing strength after mastic had remained 2 months in ambient medium: percent increase | 12 | 4 | 0 | 0 |
| Decrease, percent | | | 0 | 10 |
| Appearance of mastic glued in sheet 3 cm. thick to asbestos cement after 2 months' ageing in ambient medium | | | | |
| Flexibility to touch | Yes | Yes | Yes | Yes |
| Dryness to touch | No | No | No | Yes |
| Tackiness to touch | Yes | Yes | Yes | No |

These results show the following:

(1) Mastics 3 and 4 which contain only one of the constituents (thermoplastic resin or adhesive water-repellent resin) do not harden.

(2) Mastics 1 and 2 according to the invention have limited hardening.

(3) Mastics 1 and 2 have good resistance to creep (flow) and good adhesion, as well as good tearing strength, which improves with age.

(4) The mastic in which the thermosetting resin and the water repellent resin adhesive are bound together very intimately in the form of an interpolymer has better tearing strength and greater resistance to creep (flow), even at a high temperature (80° C.).

The classic mastics based on non-vulcanised elastomer as a rule flow when the temperature exceeds 50° C., and moreover, when they contain a solvent they may give rise, when the latter is eliminated, to the phenomenon of shrinkage. The mastics containing elastomer which vulcanises in the cold state after application are difficult to use, for the constituents have to be mixed on the spot before they are used; they retain their elastic properties during hardening, but they lose some of their adhesive properties.

The mastics according to the invention find a wide range of applications owing to their characteristic properties, as for instance as sealing mastic in general for filling of curtain wall and for filling electric junction boxes.

In a modification of the invention the mastic of the invention is associated with a sheet of a vulcanised elastomer thereby providing materials that are highly proof against water, steam and air and that have good resistance to weathering a range of chemical agents for instance ozone or sulphuric acid. The elastic properties of materials so formed permit deformations such as may occur, for example, by internal thrusts on the cracking of supports, to be taken up without breaking. These materials retain their advantageous properties through a wide temperature range and are highly resistant to ageing.

The thickness of the sheet of elastomer depends essentially on the conditions of using the surfaces on which is placed the sealing complex, and it will depend in particular on the stamping effects which the sheet has to endure. It will preferably be from 0.5 to 10 mm., and, more particularly, from 1 to 2 mm. The thickness of the layer of mastic, which depends on the state of the surface of the support preferably from 0.5 to 20 mm., and more particularly from 1 to 5 mm.

The elastomer which forms the sheet may be, generally speaking, any natural or synthetic elastomer. It is preferred to employ elastomers which have a particularly high resistance to weather and to chemicals, such as copolymers of olefins and diolefins, for example, "Butyl" rubber (a copolymer of isobutylene and isoprene), or halogenated rubber, butyl rubber, chloroprene rubber, elastomeric copolymers obtained by copolymerisation of α-mono-olefins having from 2 to 8 carbon atoms, for instance ethylene/propylene copolymers, elastomeric copolymers of one or more unsaturated endocyclic hydrocarbons and monoolefins, the former containing a bridge formed by one or more methylene groups, for instance norbornylene dicyclopentadiene, or 5-methylene norbornylene or polymers of vulcanisable olefins, such as polyisobutylenes having for preference a molecular weight above 20,000 and reticulated polyethylene.

The rollable mixture which can be used comprises: (1) the elastomer, (2) reinforcing fillers, such as carbon black, in particular those known by the designation of "S.R.F.," "F.E.F." and "M.T.," (3) mineral fillers, such as chalk, silica, talc and kaolin, (4) vulcanising activators, such as zinc oxide, (5) vulcanising accelerators, such as thiourea, thiazoles, carbamates and quinones, (6) vulcanising agents such as sulphur and substances furnishing sulphur.

The preferential proportions of this mixture are, per 100 parts by weight of elastomer:

| | Parts by weight |
|---|---|
| Strengthening fillers | 10 to 120 |
| Vulcanising activator | 2 to 15 |
| Vulcanising accelerator | 0.5 to 10 |
| Vulcanising agents | 1 to 10 |

The sheet of vulcanised elastomer is prepared according to methods well known in the rubber industry, by mixing the elastomer with the fillers and the different vulcanising agents by means of external mixers or those of the roller type, then rolling, and finally continuous or non-continuous vulcanisation in the drying chamber or autoclave. The mastic is prepared by mixing the different components by mechanical means, such as industrial mixers.

The complex according to the invention can be manufactured either by glueing the sheet of vulcanised elastomer to a sheet of mastic obtained by rolling fresh mastic, this glueing being performed by mere pressure, or by rolling mastic straight on to the vulcanised elastomer sheet or by rolling the mastic and the mixture of non-vulcanised elastomer and the whole vulcanising by operating at a temperature such that the properties of the mastic are not affected.

The complex according to the invention may take different forms such as strips or sheets of variable dimensions. To avoid glueing together when these strips or sheets are kept on rollers, it is as well to provide an anti-adhesive intermediate sheet, such as silicone paper or polyethylene sheet.

To avoid its heating by the sun's rays, the complex may also have a sheet glued to the sheet of elastomer and consisting of a reflecting material, as for instance embossed aluminum sheet.

The complex according to the invention can be applied generally as a sealing material such as for roofs, terraces, swimming baths or storage tanks. Its laying is greatly aided by the self-adhesive properties of the mastic and by its ability to mould itself to irregularities in the surface of the support. Nevertheless, when the state of the surface of the support is very poor, it may be an advantage to apply a primary layer (primer) to agglomerate the friable particles of the surface. The primary layer can be obtained by applying, for instance, a solution or emulsion of binding agents such as bitumen, tar, cutback or a polydienic thermoplastic resin, such as the resin obtained by the polymerisation of steam-cracked petroleum fractions.

It may likewise be an advantage, in certain circumstances, to ensure the protection of the waterproofing coating consisting of the application of strips or sheets of the sealing complex according to the invention, by a layer consisting, for instance, of gravel, a concrete slab or bitumen.

With reference to the joints between the parts made of the complex, these can be effected either by the parts overlapping, or by applying a narrower strip over the joint between two adjoining parts, or else by the application of strips of complex in which the sheet of mastic protrudes on one side of the strip, while the sheet of elastomer protrudes on the other, which makes it possible to effect the joint without extra thickness.

The following example illustrates this form of the invention:

EXAMPLE 2

A sheet of "butyl" rubber was made having the following formula in parts by weight.

| | |
|---|---|
| Butyl rubber marketed under the name "Esso Butyl 035" | 100 |
| Carbon black | 72 |
| Aluminium silicate of the clay type, known as Argirec KIN 15 | 5.5 |
| Complex aluminium silicate of the kaolin type, marketed under the name of Whitetex | 5.5 |
| Zinc oxide | 5 |
| Tetramethylthiurane disulphide | 0.5 |
| Telluriumdiethyldithiocarbamate | 0.5 |
| Sulphur | 2.0 |

The mixture was prepared in the Banbury mixer without heat treatment and the accelerators were added to the external mixer. The mixture was extruded between two cylinders so as to obtain sheets 1.2 mm. thick, which were vulcanised at 160° C. for 20 minutes.

This sheet had the following characteristics.

*Before ageing*

| | |
|---|---|
| Ultimate strength, kg./sq. cm. | 99 |
| Load corresponding to elongation of 100% kg./sq. cm. | 12.1 |
| Ultimate elongation, percent | 650 |
| Hardness (Shore degree A) | 52 |

*After ageing for 72 hours at 100° C.*

| | |
|---|---|
| Ultimate strength, kg./sq. cm. | 82.5 |
| Load corresponding to 100% elongation kg./sq. | 20.4 |
| Ultimate elongation, percent | 520 |
| Hardness (degree Shore A) | 60 |

A mastic was prepared complying with the following formula (in parts by weight)

| | |
|---|---|
| Butyl rubber (Esso Butyl 218) | 100 |
| Carbon black | 550 |
| Short-fibred asbestos | 150 |
| Polyisobutylene of molecular weight 880 marketed as NAPWIS 85 | 100 |
| Zinc oxide | 5 |
| Stearic acid | 3 |
| Interpolymer | 100 |

This interpolymer was obtained as follows:

A petroleum resin (molecular weight 1400—ring and ball softening point 96° C.—Gardner colour in 50% solution in toluene 10+) was reduced to power and mixed in the proportion of 24 parts by weight for 1 hour 15 minutes at a temperature of 20° C. with, formaldehyde (24 parts by weight) in 30% solution in water urea (24 parts by weight) a dispersant (2 parts by weight) consisting of a hydroxyethylene amine complying with the formula

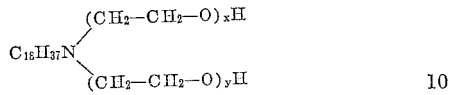

in which $x+y=50$, in the presence of a catalyst consisting of 3 parts by weight of $NH_4OH$.

After evaporation under vacuum in a drying chamber at ambient temperature for 3 hours, an interpolymer was obtained containing 50% petroleum resin and 50% urea/formol in the form of yellow granules.

The mastic was prepared in a mixer of the Werner type at 60° C., addition being made in the following order: previously masticated "Butyl" rubber the different fillers and, finally the interpolymer together with the asbestos.

The whole of the operation took 40 minutes for 2 kg. mastic. This mastic was rolled between two cylinders, so as to obtain a sheet 1.5 mm. thick.

The complex according to the invention was prepared by gluing together by mere pressure the sheet of "Butyl" rubber and the sheet of mastic.

A sheet of this complex measuring 5 x 5 cm. was applied to a sheet of asbestos cement, the mastic being in contact with the said sheet.

It was found that the force needed to separate the complex, measured with the aid of the "Bwick" dynamometer, was more than 11 kg. the sheet of asbestos cement covered with the complex and suspended vertically in a drying closest at 80° C. displayed no flow (creep) or ungluing even after remaining 15 days in a drying chamber.

It was moreover possible to ascertain that the complex adhered well even to very irregular cement surfaces, without cracking, even in the presence of cracks in the sheet and after ageing.

The complex was able to stand up to tensile stresses entailing a relatively great elongation, without affecting the properties of the layer of plastic.

What is claimed is:
1. A method of preparing a mastic composition which comprises blending together
   (a) at least one non-vulcanized elastomer wherein the elastomer is butyl rubber, halogenated butyl rubber, polychloroprene, copolymers of $C_2$ to $C_8$ alpha-monoolefins, terpolymers of ethylene, propylene and an endocyclic hydrocarbon containing a bridge formed by one or more methylene groups, or polyisobutylenes and reticulated polyethylenes having a molecular weight greater than 20,000; and
   (b) about 5 to about 500 parts of an interpolymer wherein said interpolymer is formed by
      (1) polymerizing mono- and diolefins obtained in the steam cracking of petroleum distillates in the presence of the Friedel-Crafts catalyst,
      (2) reducing the polymer so formed to a powder,
      (3) reacting the powdered polymer with equal parts of formaldehyde in a water solution and urea in the presence of an oxyethylenated amine having the formula:

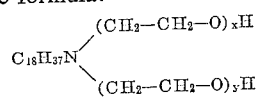

wherein $x+y=50$ and a catalyst consisting of $NH_4OH$, and
      (4) drying the reaction products under vacuum for a time sufficient to remove substantially all of the water.

2. The process of claim 1 wherein the non-vulcanized elastomer is polychloroprene.

3. The process of claim 1 wherein the non-vulcanized elastomer is ethylene propylene rubber.

4. The process of claim 1 wherein the non-vulcanized elastomer is a copolymer of one or more monoolefins and endocyclic hydrocarbons containing a bridge formed by one or more ethylene groups.

5. The process of claim 1 wherein the non-vulcanized elastomer is a polyisobutylene having a molecular weight of at least 20,000.

6. A mastic composition comprising
   (a) at least one non-vulcanized elastomer wherein the elastomer is butyl rubber, halogenated butyl rubber, polychloroprene, copolymers of $C_2$ to $C_8$ alpha-monoolefins, terpolymers of ethylene, propylene and an endocyclic hydrocarbon containing a bridge formed by one or more methylene groups, or polyisobutylenes and reticulated polyethylenes having a molecular weight greater than 20,000; and
   (b) about 5 to 500 parts of an interpolymer prepared by the copolymerization of
      (1) a petroleum resin prepared by the polymerization of mono- and diolefins obtained in the steam cracking of petroleum distillates in the presence of a Friedel-Crafts catalyst,
      (2) urea, and
      (3) formaldehyde in a water solution in the presence of an ammonia catalyst and an oxyethylenated amine having the formula:

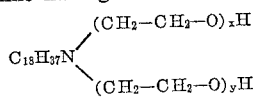

wherein $x+y=50$.

7. A pressure sensitive tape comprising the mastic composition of claim 6 in association with a backing tape wherein the backing tape is a vulcanized elastomer selected from the group consisting of natural rubber, butyl rubber, halogenated butyl rubber, chloroprene rubber, copolymers of $C_2$ to $C_8$ alpha-monoolefins, terpolymers of ethylene, propylene and an unsaturated endocyclic hydrocarbon containing a bridge of one or more methylene groups.

References Cited
UNITED STATES PATENTS 2,471,234  5/1949  Morris et al. -------- 260—852
3,242,110  3/1966  Korpman ---------- 260—852

MURRAY TILLMAN, Primary Examiner.

J. C. BLEUTGE, Assistant Examiner.